United States Patent
Namiranian

(10) Patent No.: US 10,362,475 B2
(45) Date of Patent: Jul. 23, 2019

(54) SUBSCRIPTION MANAGEMENT SERVICE DATA FEEDS

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/816,713

(22) Filed: Nov. 17, 2017

(65) Prior Publication Data

US 2019/0028881 A1    Jan. 24, 2019

Related U.S. Application Data

(60) Provisional application No. 62/535,192, filed on Jul. 20, 2017.

(51) Int. Cl.
*H04W 4/00* (2018.01)
*H04W 8/18* (2009.01)
(Continued)

(52) U.S. Cl.
CPC .......... *H04W 8/183* (2013.01); *H04B 1/3816* (2013.01); *H04W 4/70* (2018.02); *H04W 88/02* (2013.01)

(58) Field of Classification Search
CPC .......... H04W 8/183; H04W 4/70; H04W 4/14
See application file for complete search history.

(56) References Cited

U.S. PATENT DOCUMENTS 9,572,016 B2   2/2017  Cormier et al.
9,705,546 B2   7/2017  Lee et al.
(Continued)

FOREIGN PATENT DOCUMENTS

EP        2858393 A1   4/2015
KR    20130027096 A    3/2013
(Continued)

OTHER PUBLICATIONS

The International Search Report and Written Opinion for PCT Application No. PCT/US2018/042181 dated Oct. 29, 2018, 11 pages.
The International Search Report and Written Opinion for PCT Application No. PCT/US2018/042182 dated Oct. 25, 2018, 9 pages.
The International Search Report and Written Opinion for PCT Application No. PCT/US2018/042183 dated Oct. 25, 2018, 10 pages.
(Continued)

*Primary Examiner* — Pakee Fang
(74) *Attorney, Agent, or Firm* — Han Santos, PLLC

(57) ABSTRACT

Service data feeds that indicate multiple Embedded Subscriber Identity Module (eSIM) profiles provided by one or more eSIM profile vendor are loaded into one or more profile data stores of a subscription management service may be received from the subscription management service. The profile data stores may include a Subscription Manager Data Preparation (SM-DP) profile data store or a Subscription Manager Data Preparation Plus (SM-DP+) profile data store. A request is then received from an entity to perform an action with respect to a particular eSIM profile that has a specific Integrated Circuit Card identifier (ICCID). The request is forwarded to the subscription management service in response to determining that the specific ICCID matches an ICCID of an eSIM profile that is indicated by a service data feed as being loaded into a profile data store of the subscription management service. Accordingly, the subscription management service may implement the action with respect to the particular eSIM profile.

20 Claims, 7 Drawing Sheets

(51) Int. Cl.
*H04W 4/70* (2018.01)
*H04B 1/3816* (2015.01)
*H04W 88/02* (2009.01)

(56) References Cited

U.S. PATENT DOCUMENTS

| | | |
|---|---|---|
| 9,712,996 B2 | 7/2017 | Park |
| 2010/0311404 A1 | 12/2010 | Shi et al. |
| 2013/0301617 A1 | 11/2013 | Kuhn et al. |
| 2014/0140507 A1* | 5/2014 | Park ................ H04W 8/245 380/247 |
| 2014/0308991 A1* | 10/2014 | Lee ................ H04W 8/183 455/558 |
| 2015/0110035 A1 | 4/2015 | Lee et al. |
| 2015/0305004 A1 | 10/2015 | Ohta et al. |
| 2016/0020802 A1 | 1/2016 | Lee et al. |
| 2016/0094930 A1 | 3/2016 | Ramanna et al. |
| 2016/0119780 A1 | 4/2016 | Jung et al. |
| 2016/0283216 A1 | 9/2016 | Gao |
| 2016/0302070 A1 | 10/2016 | Yang et al. |
| 2016/0316356 A1* | 10/2016 | Li .................. H04W 8/183 |
| 2017/0048713 A1 | 2/2017 | Guday et al. |
| 2017/0070878 A1 | 3/2017 | Anslot et al. |
| 2017/0150356 A1 | 5/2017 | Li et al. |
| 2017/0171742 A1 | 6/2017 | Yang |
| 2018/0014178 A1* | 1/2018 | Baek .............. H04W 8/265 |
| 2018/0109942 A1* | 4/2018 | Lipovkov ........ H04W 8/183 |
| 2018/0123803 A1 | 5/2018 | Park et al. |
| 2018/0131699 A1 | 5/2018 | Park et al. |
| 2018/0160294 A1* | 6/2018 | Lee ................ H04W 12/10 |
| 2018/0176768 A1* | 6/2018 | Baek .............. H04W 8/205 |
| 2018/0295500 A1 | 10/2018 | Yang |

FOREIGN PATENT DOCUMENTS

| | | |
|---|---|---|
| KR | 20140024796 A | 3/2014 |
| KR | 20170007807 A | 1/2017 |
| KR | 20170077489 A | 7/2017 |
| WO | 2014131785 A1 | 9/2014 |
| WO | 2016013827 A1 | 1/2016 |
| WO | 2016091414 A1 | 6/2016 |
| WO | 2016167551 A1 | 10/2016 |

OTHER PUBLICATIONS

The International Search Report and Written Opinion for PCT Application No. PCT/US2018/042185 dated Oct. 29, 2018, 10 pages.
The Non-Final Office Action for U.S. Appl. No. 15/816,793 dated Oct. 25, 2018, 37 pages.
The Non-Final Office Action for U.S. Appl. No. 15/816,826 dated Nov. 13, 2018, 45 pages.
U.S. Appl. No. 15/816,753, Notice of Allowance, dated Mar. 13, 2019, 35 pages.
U.S. Appl. No. 15/816,793, Final Office Action, dated Mar. 8, 2019, 31 pages.

* cited by examiner

SUBSCRIPTION MANAGEMENT SERVICE DATA FEEDS

CROSS REFERENCE TO RELATED PATENT APPLICATION

This application claims priority to U.S. Provisional Patent Application No. 62/535,192, filed on Jul. 20, 2017, entitled "Subscription Managers," which is hereby incorporated by reference in its entirety.

BACKGROUND

The use of Embedded Universal Integrated Circuit Cards (eUICCs), also referred to as Embedded Subscriber Identity Modules (eSIMs), are becoming increasingly prevalent in consumer and machine-to-machine (M2M) communication fields. Unlike a traditional UICC or SIM card that exists as a removable smart card that is transferrable between multiple devices, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that authenticates a subscriber to a wireless communication carrier. Other data that are stored in the eSIM profile may include carrier network information, security authentication information, a list of accessible network services, and/or so forth. The wireless communication carrier may transfer an eSIM profile to the eUICC of a user device in the form of a consumer device or a M2M device via an over-the-air (OTA) update. Consumer devices are network-capable devices that are generally marketed to individual consumers. For example, these devices may include a smartphone, a tablet computer, a smartwatch, a gaming console, and/or so forth. M2M devices are networked machines that use the telecommunication services provided by the wireless communication carrier to communicate with other networked machines. For example, a M2M monitoring device that is embedded on a vehicle may automatically send vehicle tracking and operation information to a remote support device at a control center. In another example, a M2M device in the form of a smart home appliance may automatically send diagnostic information to a monitoring device at a service center in case of device malfunction.

In order to provide eUICCs of user devices with eSIM profiles, a wireless communication carrier has to purchase or otherwise obtain the eSIM profiles from eSIM profile vendors. An eSIM profile vendor may be a manufacturer of eUICCs, and thus is able to generate eSIM profiles for installation in the eUICCs. Accordingly, the wireless communication carrier may place an order for a set of eSIM profiles for an eSIM profile vendor. The eSIM profile vendor then transfers the set of eSIM profiles to a profile data store of a subscription management service of the wireless communication carrier. Following the arrival of the set of eSIM profiles in the profile data store, an eSIM profile management platform of the may receive requests to provide specific eSIM profiles from the set of eSIM profiles to particular eUICCs. The requests may originate from a business support system (BSS) of the wireless communication carrier, BSSs of other wireless communication carriers that are hosted by the wireless communication carrier, or partner service or content providers of the wireless communication carrier. In turn, the eSIM profile management platform is responsible for triggering the subscription management service to distribute eSIM profiles to eUICCs of user devices. However, in some scenarios, the eSIM profile management platform may receive a request to distribute an eSIM profile to an eUICC even before an eSIM profile has arrived at the profile data store of the subscription management service. In such scenarios, the subscription management service may fail to distribute the eSIM profile to the eUICC after being directed by the eSIM profile management platform, but the cause of such an error may not be immediately apparent.

In other scenarios where there are multiple subscription management services that interfaces with an eSIM profile management platform, incoming ordered eSIM profiles that are intended to be stored in the profile data store of a first subscription management service may be accidentally routed to the profile data store of a second subscription management service. In such scenario, the misrouted eSIM profiles may become lost unless an audit is performed by an administrator of the subscription management service to identify these lost profiles.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
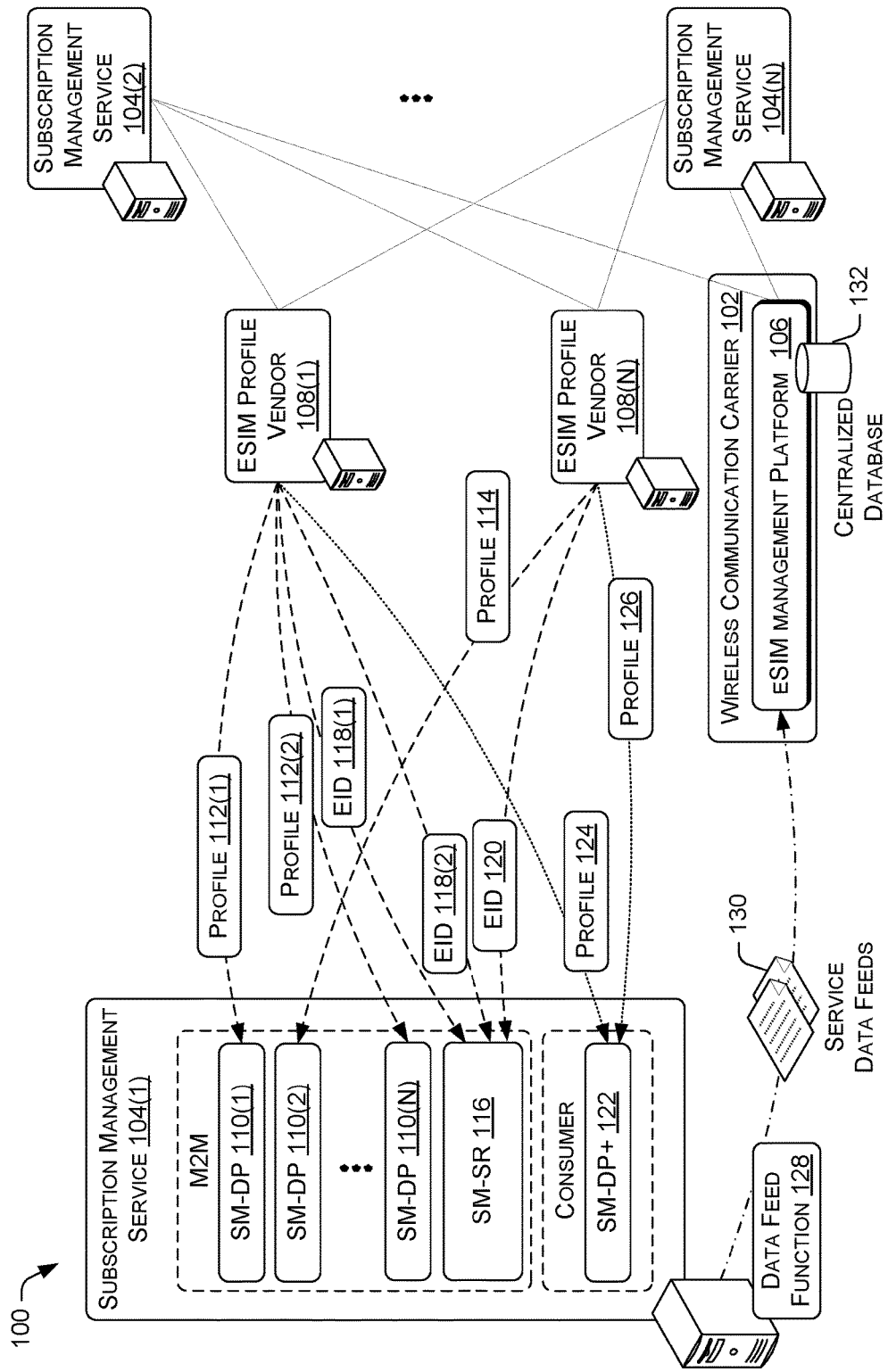
FIG. 1 illustrates an example architecture that enables the provision of service data feeds by subscription management services to an eSIM profile management platform.

This disclosure is directed to techniques that enable an eSIM profile management platform of a wireless communication carrier to receive service data feeds from multiple subscription management services. Each of the multiple subscription management services is responsible for the management of one or more sets of eSIM profiles that are provisioned to eUICCs of particular user devices. A set of eSIM profiles managed by each subscription management service may belong to one or more specific entities, such as a wireless communication carrier, or multiple wireless communication carriers. In another example, the one or more specific entities may include third-party partner of a wireless communication carrier, or multiple third-party partners of the wireless communication carrier. A third-party partner of the wireless communication carrier may be a provider that provides content or services to the subscribers of the carrier, a M2M device vendor, a M2M device operator, and/or so forth. Each of the subscription management services may be provided by one or more subscriber managers. In some embodiments, each of the subscription management services may be provided by at least one Subscription Manager Data Preparation (SM-DP), at least one Subscription Manager Data Preparation Plus (SM-DP+), and at least one Subscription Manager Secure Routing (SM-SR).

The eSIM profile management platform is a backend service of a wireless communication carrier that serves as a central interface between the various entities and the subscription management services. The eSIM profile management platform enables these entities to manage eSIM profiles for deployment into eUICCs of user devices. For example, the eSIM profile management platform may receive a request from an entity to provision an eUICC of a user device with an eSIM profile, activate an eSIM profile that is stored in the eUICC for use, or delete an eSIM profile from the eUICC. In turn, the eSIM profile management platform may relay the request to the appropriate subscription management service of the multiple subscription management services that is responsible for managing the affected eSIM profile. Following the completion of the request, the eSIM profile management platform may provide a notification to the entity indicating that the request has been fulfilled.

In various embodiments, a subscription management service may receive eSIM profiles from an eSIM profile vendor. Since an eSIM profile vendor may be a manufacturer of eUICCs, the eSIM profile vendor is also referred to as an eSIM manufacturer (EUM). A subscription management service may load the received eSIM profiles into profile data stores. For example, eSIM profiles for M2M devices may be loaded into profile data stores of SM-DPs. Along with the loading of these eSIM profiles for M2M devices, the eSIM profile vendor also provides eUICC Identifiers (EIDs) of eUICCs that are for use by M2M devices. Such EIDs are loaded into a data store of a SM-SR. On the other hand, eSIM profiles for consumer devices may be loaded into profile state stores of a SM-DP+.

Following the loading of the eSIM profiles and the EIDs, the subscription management service may provide service data feeds to the eSIM profile management platform. For example, the service data feeds may include Integrated Circuit Card identifiers (ICCIDs) of the eSIM profiles that are loaded into the profile data stores of the SM-DPs and the SM-DP+. The ICCID for an eSIM profile that is contained in a service data feed may be accompanied by other associated identification information, such as a mobile network operator (MNO) identifier, a subscription management service identifier, a partner identifier, and/or an EUM identifier. The MNO identifier identifies the wireless communication carrier associated with the eSIM profile, in which the wireless communication carrier has access to the eSIM profile. The subscription management service identifier identifies a responsible subscription management service that has the authority to manage the eSIM profile. The partner identifier identifies a third-party partner of a wireless communication carrier that has access to the eSIM profile, and the eNUM identifier identifies the eSIM profile vendor that issued the eSIM profile.

The service data feeds may further include the EIDs of the eUICCs for M2M devices. The EID for an eUICC that is contained in the service data feed may also be accompanied by other associated identification information, such as a MNO identifier, a partner identifier, a subscription management service identifier, and/or an EUM identifier in a similar manner. In turn, the eSIM profile management platform may store the identification information obtained from the service data feeds in a data fee store.

The eSIM profile management platform may use the identification information from the service data feeds to regulate the activities of various entities with respect to the eSIM profiles. For example, an entity may send to the eSIM profile management platform a request to provision an eUICC of a user device with a particular eSIM profile. In turn, the eSIM profile management platform may use the ICCID of the eSIM profile to determine whether a responsible subscription management service has actually received the eSIM profile from an eSIM profile vendor for storage in a profile data store. If the subscription management service has received and stored the eSIM profile in a profile data store, the eSIM profile management platform may determine whether the entity has access to the subscription management service. Assuming that the entity has access to the subscription management service, the eSIM profile management platform may further compare the MNO identifier or the partner identifier associated with eSIM profile to the entity identifier of the entity to determine whether the entity has access to the eSIM profile. Thus, when there is a match between the identifiers, the eSIM profile management platform may forward the request of the entity to the responsible subscription management service, such that the eUICC of the user device may be provisioned with the particular eSIM profile. Otherwise, the eSIM profile management platform may notify the entity that the request of the entity has failed.

The ability of the eSIM profile management platform to receive service data feeds from multiple subscription management services allows the eSIM profile management platform to regulate access by various entities to the eSIM profiles managed by the services. The identification information in the data feeds may be used by the platform to prevent unauthorized access by an entity to a subscription management service, unauthorized access by a first entity to eSIM profiles that are ordered by a second entity. The data feeds may also reveal issues such as late or failed transmissions of eSIM profiles to a subscription management service, or eSIM profiles being mistakenly transmitted to and stored by the wrong subscription management service. The techniques described herein may be implemented in a number of ways. Example implementations are provided below with reference to the following FIGS. 1-7.

Example Architecture

FIG. 1 illustrates an example architecture 100 that enables the provision of service data feeds by subscription management services to an eSIM profile management platform. The wireless communication carrier 102 may provide a wide range of mobile communication services, as well as ancillary services and features, to subscribers and associated mobile device users. The wireless communication carrier 102 may also be referred to as a mobile network operator (MNO). In various embodiments, the wireless communication carrier 102 may provide wireless communication between multiple user devices. Further, the wireless communication carrier 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless communication carrier 102 may be implemented using multiple interconnected networks. In various embodiments, the wireless communication carrier 102 may include multiple Radio Access Networks (RANs). The RANs may be connected to each other via regional ground networks. In turn, the regional ground networks may be connected to a core network by a wide area network (WAN). Each regional portion of the wireless communication carrier 102 may include one or more RANs and a regional circuit and/or packet switched network and associated signaling network facilities. The wireless communication carrier 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless communication carrier 102 may be accessed via wired or wireless local area networks (LANs). For example, a wireless local area network may be a network that is established using Wi-Fi or Bluetooth standards and hardware.

A RAN of the wireless communication carrier 102 may include a number of base stations, also referred to as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless communication carrier 102. The core network may connect to a public packet data communication network, such as the Internet. Data and voice communications via the RANs, the core network, and the Internet may support a variety of telecommunication services through the wireless communication carrier 102.

In various embodiments, 2G and/or 3G network components of the wireless communication carrier 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless communication carrier 102 may include an Evolved Packet Core (EPC) and an IP Multimedia Subsystem (IMS) core.

The wireless communication carrier 102 may provide telecommunication services to multiple user devices, which may include consumer devices and M2M devices. Consumer devices are network-capable devices that are generally marketed to individual consumers, and are capable of obtain telecommunication and/or data communication services from the wireless communication carrier 102. For example, these devices may include a smartphone, a tablet computer, a smartwatch, a gaming console. M2M devices are networked machines that use the telecommunication services provided by the wireless carrier to communicate with other devices. Each of the user devices may be equipped with an eUICC, i.e., an integrated circuit chip that is directly wired or soldered to a circuit board of the user device. The eUICC may store one or more eSIM profiles, such as the eSIM profile 112(1). Each eSIM profile may include information for accessing telecommunication services provided by a corresponding wireless communication carrier, such as the wireless communication carrier 102. Each user device may be further equipped with a modem that enables the user device to perform telecommunication and data communication with the wireless communication carrier 102. Accordingly, the modem may encode digital information for transmission in uplink radio signals to the wireless communication carrier 102, as well as decode digital information that are received from the wireless communication carrier 102 via downlink radio signals.

A user device may receive eSIM profiles for storage on the eUICC via over-the-air (OTA) updates from wireless communication carriers. For example, a subscription management service, such as the subscription management service 104, may send one or more data packets that contain an eSIM profile to the modem of the user device via downlink communication. The data packets are assembled by the software of the modem into the eSIM profile and sent to the eUICC for installation in the eUICC.

The backend servers of the wireless communication carrier 102 may provide an eSIM profile management platform 106. The eSIM profile management platform 106 may serve as a central interface between the various entities and one or more subscription management services, such as the subscription management services 104(1)-104(N). In various embodiments, the eSIM profile management platform 106 may be an application program interface (API) abstraction layer that provides multiple APIs to the various entities, in which the entities may call the APIs to perform specific tasks. Accordingly, the eSIM profile management platform 106 enables these entities to manage eSIM profiles for deployment into eUICCs of user devices. Each of the subscription management services 104(1)-104(N) is responsible for the management of one or more sets of eSIM profiles that are provisioned to eUICCs of particular user devices. A set of eSIM profiles managed by each subscription management service may belong to one or more specific entities, such as the wireless communication carrier 102, or an associated wireless communication carrier that is hosted by wireless communication carrier 102. In another example, the one or more specific entities may include a third-party partner of a wireless communication carrier 102, or multiple third-party partners of the wireless communication carrier 102. A third-party partner of the wireless communication carrier may be a provider that provides content or services to the subscribers of the carrier, a M2M device vendor, a M2M device operator, and/or so forth. Each of the subscription management services 104(1)-104(N) may be provided by one or more subscriber managers. In some embodiments, each of the subscription management services 104(1)-104 (N) may be provided by at least one Subscription Manager Data Preparation (SM-DP), at least one Subscription Manager Data Preparation Plus (SM-DP+), and at least one Subscription Manager Secure Routing (SM-SR).

In its role as the central interface, the eSIM profile management platform 106 may receive a request from an entity to provision an eUICC of a user device with an eSIM profile, delete an eSIM profile from the eUICC, activate an eSIM profile that is stored in the eUICC for use to obtain communication services from a wireless communication carrier. In turn, the eSIM profile management platform 106 may relay the request to the appropriate subscription management service of the multiple subscription management services that is responsible for managing the affected eSIM profile. Following the completion of the request, the eSIM profile management platform may provide a notification to the entity indicating that the request has been fulfilled.

In operation, a subscription management service, such as the subscription management service 104(1), may receive eSIM profiles from one or more eSIM profile vendors 108(1)-108(N). An eSIM profile vendor may transmit the eSIM profiles to the subscription management service 104 over a communication link that is established between the vendor and the service. For example, the eSIM profiles may be delivered to the subscription management service 104(1) in response to an eSIM profile order from the wireless communication carrier 102. However, in some instances, the eSIM profile order may be initiated by another entity, such as a wireless communication carrier that is hosted by the wireless communication carrier 102, or a third-party partner of the wireless communication carrier 102. The hosted wireless communication carrier may be a mobile virtual network operator (MVNO), a virtual network operator (VNO), or a mobile other licensed operator (MOLO). In such instances, the wireless communication carrier 102 may not be aware that the order for the eSIM profiles has been placed by the entity. The eSIM profiles that are received by the subscription management service 104(1) may include eSIM profiles for M2M devices and eSIM profiles for consumer devices.

The eSIM profiles for M2M device, also referred to as M2M eSIM profiles, may be loaded into the profile data stores of SM-DPs 110(1)-110(N). In various instances, the profile data stores of each of the SM-DPs 110(1)-110(N) may hold M2M eSIM profiles that are ordered by a single entity or different entities. For example, a profile data store of the SM-DP 110(1) may hold the M2M eSIM profiles for the wireless communication carrier 102, a profile data store of the SM-DP 110(2) may hold the M2M eSIM profiles for a wireless communication carrier that is hosted by the wireless communication carrier 102, while a profile data store of the SM-DP 110(N) may hold the M2M eSIM profiles for a third-party partner of the wireless communication carrier 102. In another example, a profile data store of the SM-DP 110(1) may hold the M2M eSIM profiles for the wireless communication carrier 102, but a profile data store belonging to each of the SM-DP 110(2) and 110(N) may hold the M2M eSIM profiles for a respective third-party partner of the wireless communication carrier 102. Thus, as shown in FIG. 1, the eSIM profile vendor 108(1) may transmit a M2M eSIM profile 112(1) to the SM-DP 110(1), and transmit a M2M eSIM profile 112(2) to the SM-DP 110(N). Further, the eSIM profile vendor 108(N) may transmit a M2M eSIM profile 114 to the SM-DP 110(2). However, in other instances, a profile data store of a SIM-DP may be configured to hold M2M eSIM profiles of multiple entities.

Along with the loading of the M2M eSIM profiles into one or more SM-DPs, the eSIM profile vendor also provides eUICC ID (EIDs) of eUICCs that are for use by the M2M devices. Accordingly, the M2M eSIM profiles may be eventually deployed on these eUICCs. Such EIDs, referred to as M2M EIDs, are loaded into a data store of the SM-SR 116. For example, as shown in FIG. 1, the eSIM profile vendor 108(1) may transmit the M2M EID 118(1) and M2M EID 118(2) to a data store of the SM-SR 116. Likewise, the eSIM profile vendor 108(2) may transmit an M2M EID 120 to the SM-SR 116.

On the other hand, the eSIM profiles for consumer devices, also referred to as consumer eSIM profiles, may be loaded into profile state stores of a SM-DP+, such as the SM-DP+ 122. In some instances, each profile data store of the SM-DP+ 122 may hold consumer eSIM profiles of a single entity. In other instance, a single profile data store of the SM-DP+ 122 may hold eSIM profiles of multiple different entities. For example, as shown in FIG. 1, the eSIM profile vendor 108(1) may transmit a consumer eSIM profile 124 to the SM-DP+ 122. Likewise, the eSIM profile vendor 108(2) may transmit a consumer eSIM profile 124 to the SM-DP+ 126. Further, while the subscription management service 104(1) is illustrated as having a single SM-DP+ 122, the service may be configured with multiple SM-DP+ s in other embodiments. In such embodiments, each SM-DP+ is responsible for managing the consumer eSIM profiles of a different entity, or the multiple SM-DP+ s can collectively manage consumer eSIM profiles of a single entity.

The loading of the eSIM profiles and the M2M EIDs into the data stores of the subscription management service 104(1) may trigger a data feed function 128 of the service to provide service data feeds 130 to the eSIM profile management platform 106. For example, the service data feeds may include Integrated Circuit Card identifiers (ICCIDs) of the eSIM profiles that are loaded into the profile data stores of the SM-DPs and the SM-DP+. The ICCID for an eSIM profile that is contained in a service data feed may be accompanied by other associated identification information, such as a mobile network operator (MNO) identifier, a subscription management service identifier, a partner identifier, and/or an EUM identifier. The MNO identifier identifies the wireless communication carrier associated with the eSIM profile, in which the wireless communication carrier has access to the eSIM profile. The subscription management service identifier identifies a responsible subscription management service that has the authority to managing the eSIM profile. The partner identifier identifies a third-party partner of a wireless communication carrier that has access to the eSIM profile, the EUM identifier identifies the eSIM profile vendor that issued the eSIM profile. In some instances, the service data feeds may further include an identifier of the specific SM-DP or SM-DP+ whose profile data store actually stored each eSIM profile, and/or an indicator of whether the eSIM profile is a M2M eSIM profile or a consumer eSIM profile.

The service data feeds may further include the M2M EIDs of the eUICCs for the M2M devices that are loaded into an EID data store of a SM-SR. The M2M EID for an eUICC that is contained in the service data feed may also be accompanied by other associated identification information, such as a MNO identifier, a partner identifier, a subscription management service identifier, an SM-SR identifier, and/or an EUM identifier in a similar manner. In some embodiments, these identifiers of each eSIM profile or each M2M EID may be assigned by a corresponding eSIM profile vendor that provided the eSIM profile or M2M EID.

In some embodiments, the data feed function 128 of the subscription management service 104(1) may provide the service data feeds after receiving each batch of eSIM profiles or EIDs from an eSIM profile vendor. For example, the data feed function 128 may provide a service data store after receiving a batch of M2M eSIM profiles, a batch of consumer eSIM profiles, or a batch of M2M EIDs. In other embodiments, the data feed function 128 may periodically provide service data feeds that contains information on eSIM profiles that are newly received at regular time intervals (e.g., every minute, every five minutes, every hour, etc.). This means that a service data feed may contain information for a mixture of M2M eSIM profiles, consumer eSIM profiles, and/or M2M EIDs. The service data stores are transmitted by the subscription management service 104(1) via a communication link to the eSIM profile management platform 106. The subscription management service 104(1) may provide the data feeds to the eSIM profile management platform 106 via various protocols and formats. The protocols may include Simple Object Access Protocol (SOAP), Representational State Transfer (REST), and/or so forth, and the formats may include Hypertext Markup Language (HTML), Extensible Markup Language (XML), JavaScript Object Notation (JSON), and/or so forth.

In turn, the eSIM profile management platform 106 may store the information obtained from the service data feeds in a centralized database 132. Accordingly, the centralized database 132 is used by the eSIM profile management platform 106 to track the ICCID of each eSIM profile that has been loaded, the specific subscription management service that is responsible for managing each loaded eSIM profile or each loaded M2M EID, an identity of the specific SM-DP or SM-DP+ whose data store holds each loaded eSIM profile, an identity of the specific SM-SR whose data store holds each loaded M2M EID. The centralized database 132 further contains data that indicates an identity of the wireless communication carrier and/or an identity of the third-party partner that has access to each loaded eSIM profile or M2M EID. In various embodiments, the subscription management services 104(2)-104(N) may provide service data feeds regarding the eSIM profiles and M2M EIDs that they receive from the eSIM profile vendors 108(1)-108(N) in a similar manner as the subscription management service 104(1). In turn, the information from these data feeds are also stored in the centralized database 132 in the same manner as described above. As further discussed with respect to FIG. 2 below, the eSIM profile management platform 106 may use the identification information in the service data feeds received from the subscription management services 104(1)-104(N) to regulate the activities of various entities with respect to the eSIM profiles.

Example Operating Environment

Figure 2:
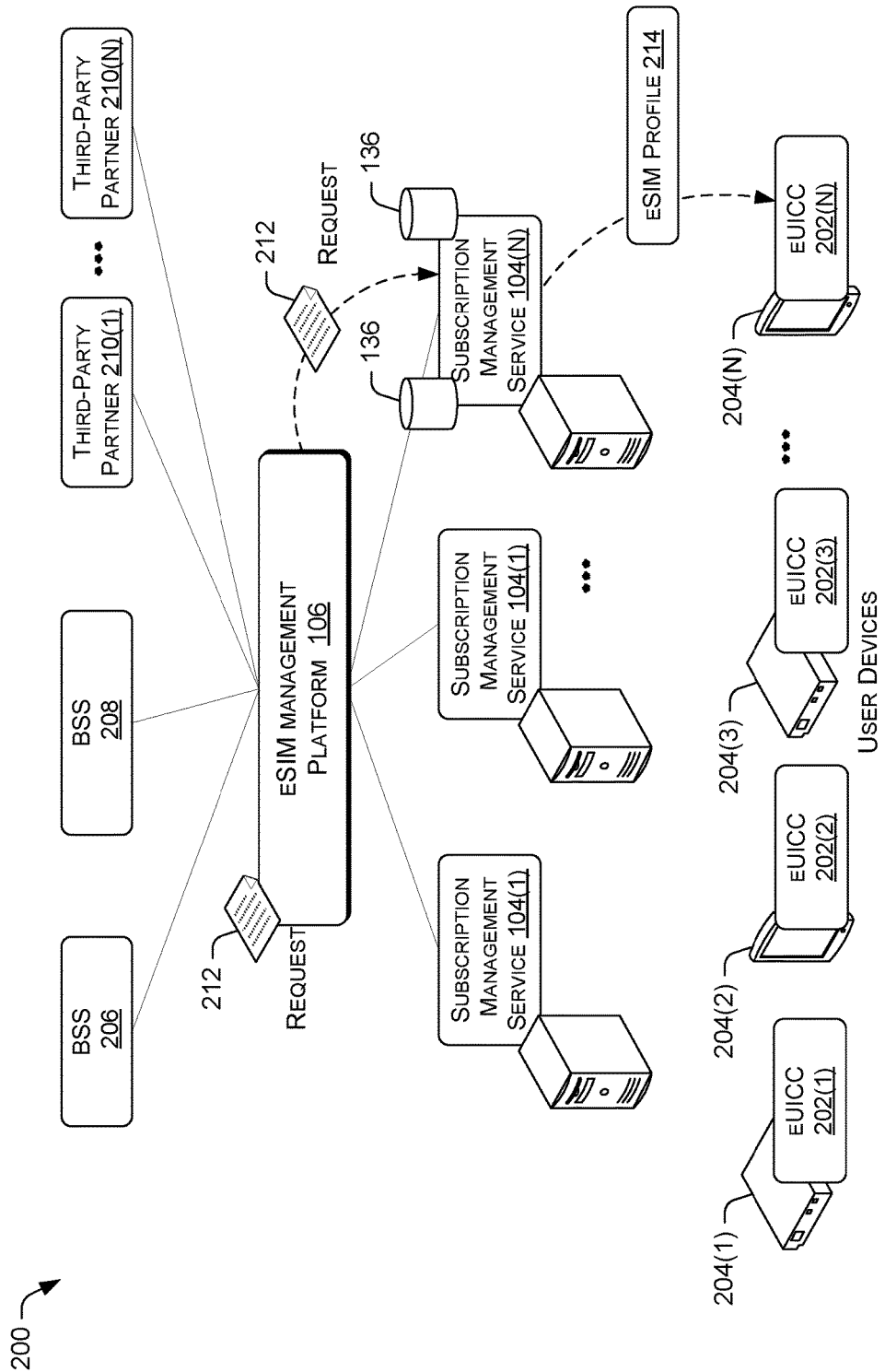
FIG. 2 illustrates an operating environment that enables the eSIM manager platform to perform error reporting and eSIM profile access control based on the service data feeds provided by the subscription management services.

FIG. 2 illustrates an operating environment 200 that enables the eSIM profile management platform 106 to perform error reporting and eSIM profile access control based on the service data feeds provided by the subscription management services. The operating environment 200 includes the eSIM profile management platform 106 that is operated by a wireless communication carrier 102. The eSIM profile management platform 106 provides a central interface for multiple entities to perform actions with respect to the eSIM profiles that are stored in the profile data stores of the subscription management services 104(1)-104(N). For example, the actions may include sending an eSIM profile for storage in an eUICC of a user device, activating an eSIM profile for use to receive telecommunication services from the wireless communication carrier, disabling an eSIM profile to terminate access of the user device to the telecommunication services, or deleting the eSIM profile from the eUICC of the user device. As shown in FIG. 2, the eUICC may be one of the eUICCs 202(1)-202(N) that resides in the user devices 204(1)-204(N). The multiple entities may include the wireless communication carrier 102 or another wireless communication carrier that is hosted by the carrier 102. For example, the wireless communication carrier 102 may interact with the eSIM profile management platform 106 via its BSS 206. Likewise, the hosted wireless communication carrier may interact with the eSIM profile management platform 106 via its BSS 208. The multiple entities may further include third-party partners, such as third-party partners 210(1)-210(N) that interact with the eSIM profile management platform 106 via respective eSIM management applications. In some embodiments, the subscription management services 104(1)-104(N) may be configured to receive action requests solely from the eSIM profile management platform 106, rather than individual entities. Such a configuration may streamline the deployment and operation of the subscription management services 104(1)-104(N), as well as enhance network security because all action requests are funneled through a trusted platform.

The eSIM profile management platform 106 may use the information contained in the service data feeds 130 to regulate the activities of various entities with respect to the eSIM profiles. For example, an entity may send to the eSIM profile management platform 106 a request 212 to provision the eUICC 202(N) of the user device 204(N) with a particular eSIM profile 214, in which the request includes an ICCID of the eSIM profile 214 and an entity identifier of the entity. In turn, the eSIM profile management platform 106 may input the ICCID of the eSIM profile 214 into the centralized database 132 to determine whether a responsible subscription management service has reported that it actually received the eSIM profile 214 from an eSIM profile vendor. If the centralized database 132 shows that a subscription management service, such as the subscription management service 104(N), has stored the eSIM profile 214 into its profile data store, the eSIM profile management platform may use the entity identifier of the entity to determine whether the entity has access to the subscription management service 104(N). For example, a permission list maintained by the eSIM profile management platform 106 for the subscription management service 104(N) may indicate that the BSS 206(1) of a first wireless communication carrier 106 has permission to access the subscription management service 104(N), but the BSS 206 of a second wireless communication carrier is not permitted. In another example, the permission list for the subscription management service 104(N) may grant third-party partner 210(1) access, but denies third-party partner 210(N) access. Thus, by comparing the entity identifier of the entity to the entity identifiers of entities that either has permission or is denied permission in the permission list, the eSIM profile management platform 106 may determine whether the entity has access to the subscription management service 104(N).

Assuming that the entity has access to the subscription management service 104, the eSIM profile management platform 106 may further compare the MNO identifier or the partner identifier associated with eSIM profile 214 to the entity identifier of the entity to determine whether the entity has access to the eSIM profile 214. For example, the third-party partner 210(1) may be trying to access the eSIM profile 214 when the eSIM profile 214 has a partner identifier that matches the entity identifier of the third-party partner 210(N). In another example, the MNO identifier of the eSIM profile 214 may match an entity identifier of the wireless communication carrier 102, but not the entity identifier of a wireless communication carrier hosted by the carrier 102. Thus, when there is a match between the entity identifier of the entity that initiated the request with respect to the eSIM profile 214 and the MNO identifier or the partner identifier, the eSIM profile management platform 106 may forward the request of the entity to the subscription management service 104(N). In this way, the subscription management service 104 may initiate a procedure that eventually provisions the eUICC 202(N) of the user device 204(N) with the eSIM profile 214.

However, if at any point the eSIM profile management platform 106 determines that the request 212 with respect to the eSIM profile 214 cannot be completed because of lack of access by the entity or unavailability of the eSIM profile 214, the eSIM profile management platform 106 may notify the entity that the request 212 of the entity has failed. This means that the request 212 will not be forwarded by the eSIM profile management platform 106 to the subscription management service 104(N). In the scenario where the request 212 failed because of the unavailability of the eSIM profile 214, the eSIM profile management platform 106 may increase efficiency in the use of computing resources by not forwarding the request 212. This is because the subscription management service 104(N) is able to forego a complicated procedure to provision the eSIM profile 214 to the eUICC 202(N) by not receiving the request, which would have eventually failed due to the unavailability.

In other embodiments, the request 212 may be a request to perform an action on an eSIM profile that is already in an eUICC instead of provisioning the eSIM profile to an eUICC. For example, the request 212 may be for activating the eSIM profile to obtain communication services from a wireless communication carrier, deleting the eSIM profile from the eUICC, or otherwise modify the eSIM profile. In such embodiments, the eSIM profile management platform 106 may compare the entity identifier of the entity to a subscription management service permission list, a MNO identifier, and/or a partner identifier that are associated with the eSIM profile to determine whether the entity has access to perform the action in the same manner as described above. Furthermore, in other embodiments, the entity may make a request to perform an action with respect to a M2M EID. In such embodiments, the eSIM profile management platform 106 may compare the entity identifier of the entity to a subscription management service permission list, a MNO identifier, and/or a partner identifier that are associated with the M2M EID to determine whether the entity has access to perform the action on the M2M EID in a similar manner. The action may be in the form of reading, modifying, or deleting the M2M EID from a SM-SR or an eUICC of a user device. It will be appreciated that in other embodiments, each of the permission check or access check can be performed independently of each other. Thus, a subscription management service may be configured to perform one or more of these checks, rather than every check, in order to grant or deny an entity access to an eSIM profile.

In some embodiments, the eSIM profile management platform 106 may have an audit function that monitors and corrects any errors in the distribution of eSIM profiles to the subscription management services 104(1)-104(N) by the eSIM profile vendors 108(1)-108N. For instance, an eSIM profile may have a subscription management service identifier that indicates the profile is to be managed by a first subscription management service, but the eSIM profile may be stored in a profile data store of a second subscription management service. In such an instance, the audit function may transfer the eSIM profile from the data store of the second subscription management service to a datastore of the first subscription management service. In another instance, an eSIM profile may have an indicator that shows that the profile is an M2M eSIM profile, but the eSIM profile may be stored in a profile data store that belongs to a SM-DP+ of a subscription management service instead of a profile data store of a SM-DP of the service. In such an instance, the audit function may transfer the eSIM profile to the profile data store of the SM-DP. These error correction transfers by the audit function may also trigger the data feed function 128 of a corresponding subscription management service to send a service data feed to update the eSIM profile management platform 106 of the changes.

Example Computing Device Components

Figure 3:
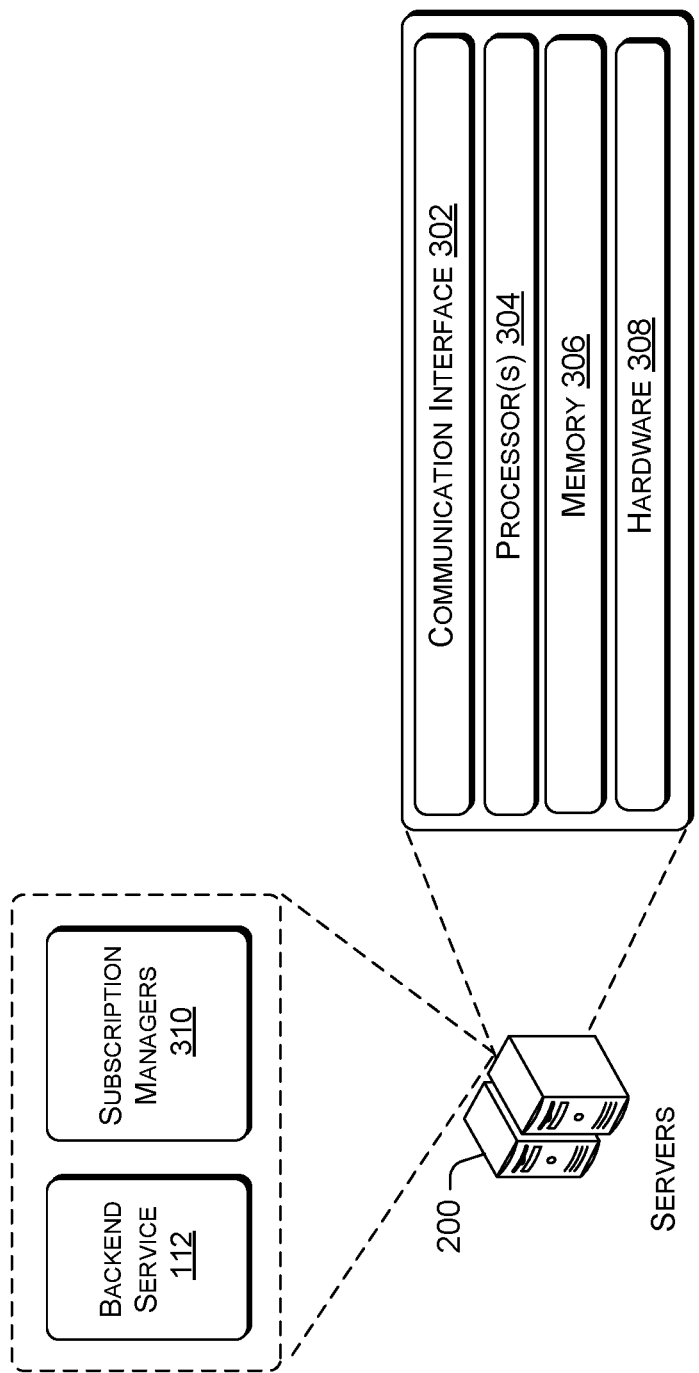
FIG. 3 is a block diagram showing various components of one or more illustrative computing devices that support the provision of service data feeds by subscription management services to an eSIM profile management platform.

FIG. 3 is a block diagram showing various components of one or more illustrative computing devices that support the provision of service data feeds by subscription management services to an eSIM profile management platform. The computing devices 300 may include a communication interface 302, one or more processors 304, memory 306, and hardware 308. The communication interface 302 may include wireless and/or wired communication components that enable the computing devices 300 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In other embodiments, the computing devices 300 or components thereof may be virtual computing devices in the form of virtual machines or software containers that are hosted in a computing cloud.

The computing devices 300 may implement various back-end services and components of the wireless communication carrier 102, such as the subscription management services 104(1)-104(N), the eSIM profile management platform 106, BSS 206, and/or BSS 208. The implementation involves the execution of software, applications, and/or modules that include routines, program instructions, code segments, objects, and/or data structures that perform particular tasks or implement particular abstract data types.

Example Processes

FIGS. 4-7 present illustrative processes 400-700 for enabling subscription management service to provide service data feeds to an eSIM profile management platform for the purpose of eSIM profile management and control. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1 and the operating environment 200 of FIG. 2.

Figure 4:
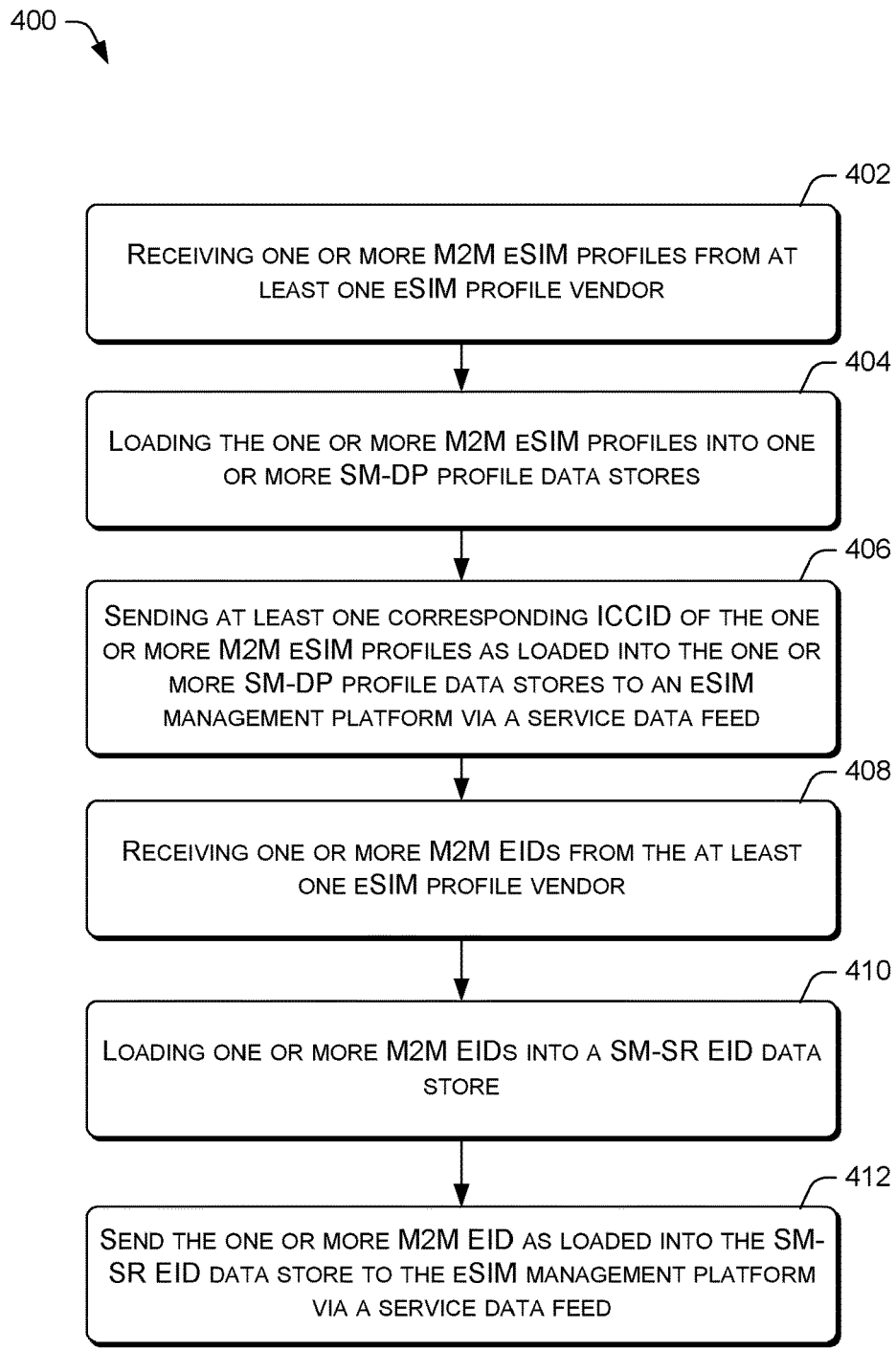
FIG. 4 is a flow diagram of an example process for receiving service data feeds for M2M devices from a subscription management service.

FIG. 4 is a flow diagram of an example process 400 for receiving service data feeds for M2M devices from a subscription management service. At block 402, a subscription management service may receive one or more M2M eSIM profiles from at least one eSIM profile vendor. In various embodiments, the one or more M2M eSIM profiles may have been ordered by a wireless communication carrier 102, a wireless communication carrier that is hosted by the wireless communication carrier 102, or a third-party partner of the wireless communication carrier 102. The one or more M2M eSIM profiles may be delivered to the subscription management service via a communication link between an eSIM profile vendor and the subscription management service.

At block 404, the subscription management service may load the one or more M2M eSIM profiles into one or more SM-DP profile data stores of the subscription management service. In various embodiments, the profile data stores of each SM-DP may hold M2M eSIM profiles that are ordered by a single entity or different entities. At block 406, the subscription management service may send at least one corresponding ICCID of the one or more M2M eSIM profiles as loaded into the one or more SM-DP profile data stores to the eSIM profile management platform 106 via a service data feed. In various embodiments, The ICCID of each M2M eSIM profile in the service data feed may be accompanied by other associated identification information, such as a mobile network operator (MNO) identifier, a subscription management service identifier, a partner identifier, and/or an EUM identifier. In some instances, the service data feed may further include an identifier of the specific SM-DP whose profile data store actually stored each M2M eSIM profile.

At block 408, the subscription management service may receive one or more M2M EIDs from the at least one eSIM profile vendor. Each M2M EID belongs to an eUICC that is used by a M2M device, and a M2M eSIM profile may be eventually deployed into the eUICC. At block 410, the subscription management service may load the one or more M2M EIDs into a SM-SR EID data store.

At block 412, the subscription management service may send the one or more M2M EIDs as loaded into the SM-SR data store to the eSIM profile management platform 106. Each M2M EID may be accompanied by other associated identification information, such as a mobile network operator (MNO) identifier, a subscription management service identifier, a partner identifier, and/or an EUM identifier. In various embodiments, the service data feed for sending the one or more M2M EIDs may be the same service data feed as the one used to send the one or more ICCIDs, or a different service data feed.

Figure 5:
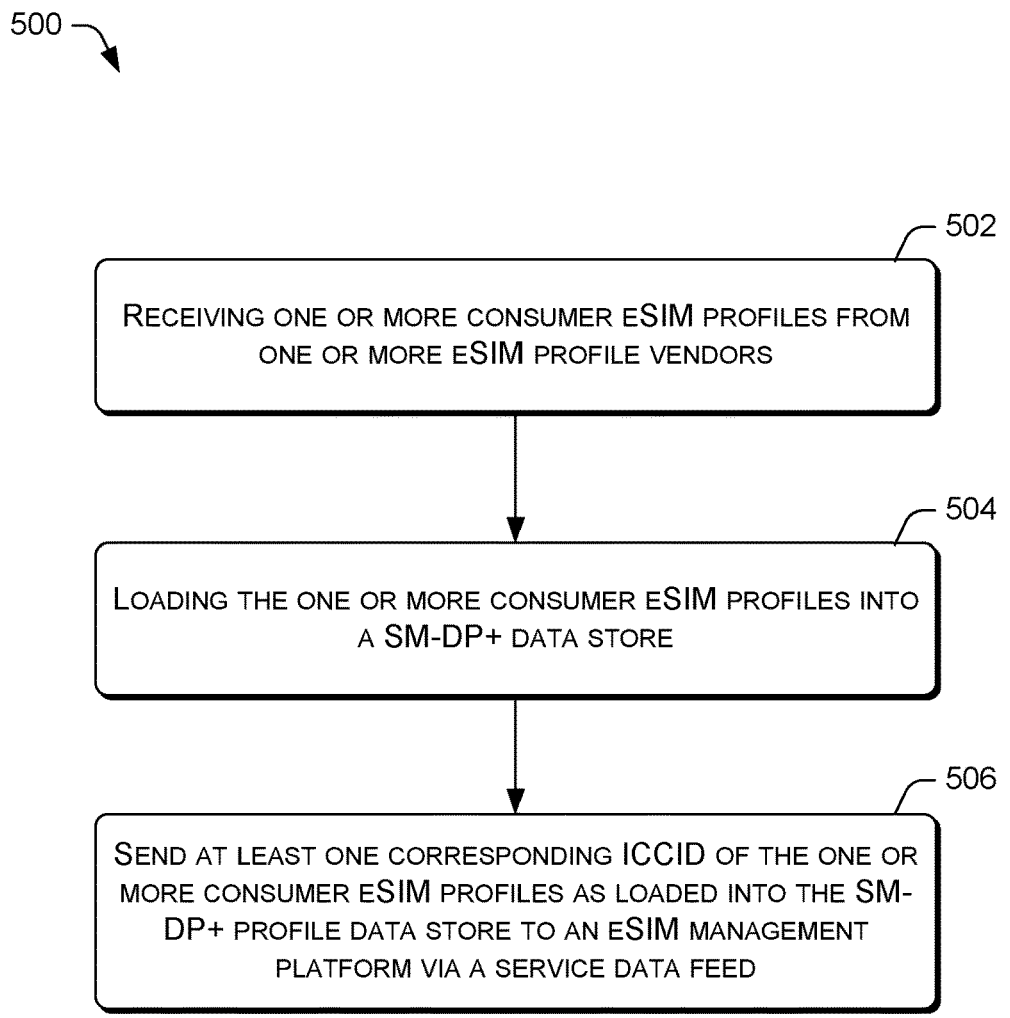
FIG. 5 is a flow diagram of an example process for receiving service data feeds for consumer devices from a subscription management service.

FIG. 5 is a flow diagram of an example process 500 for receiving service data feeds for consumer devices from a subscription management service. At block 502, the subscription management service may receive one or more consumer eSIM profiles from one or more eSIM profile vendors. various embodiments, the one or more consumer eSIM profiles may have been ordered by a wireless communication carrier 102, a wireless communication carrier that is hosted by the wireless communication carrier 102, or a third-party partner of the wireless communication carrier 102. The one or more consumer eSIM profiles may be delivered to the subscription management service via a communication link between an eSIM profile vendor and the subscription management service.

At block 504, the subscription management service may load the one or more consumer eSIM profiles into a SM-DP+ data store. In various embodiments, the profile data stores the SM-DP+ may hold consumer eSIM profiles that are ordered by a single entity or different entities. At block 506, the subscription management service may send at least one corresponding ICCID of the one or more consumer eSIM profiles as loaded into the SM-DP+ profile data store to the eSIM profile management platform 106 via a service data feed. In various embodiments, The ICCID of each consumer eSIM profile in the service data feed may be accompanied by other associated identification information, such as a mobile network operator (MNO) identifier, a subscription management service identifier, a partner identifier, and/or an EUM identifier. In some instances, the service data feed may further include an identifier of the specific SM-DP+ whose profile data store actually stored each consumer eSIM profile.

Figure 6:
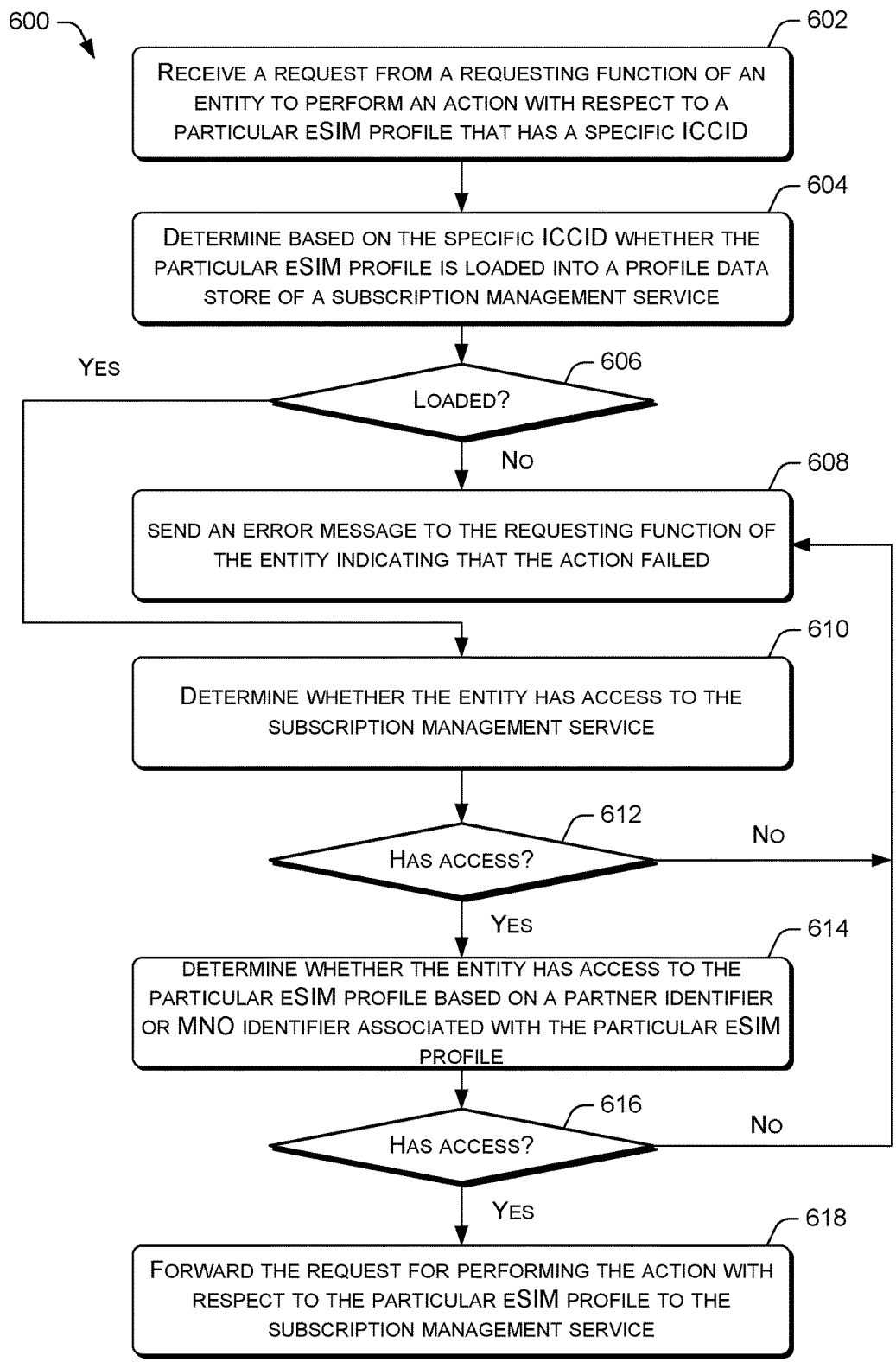
FIG. 6 is a flow diagram of an example process for using the service data feed information from subscription management services to control access to eSIM profiles that are stored in a profile data store of a subscription management service.

FIG. 6 is a flow diagram of an example process 600 for using the service data feeds from subscription management services to control access to eSIM profiles that are stored in a profile data store of a subscription management service. At block 602, the eSIM profile management platform 106 may receive a request from a requesting function of an entity to perform an action with respect to a particular eSIM profile that has a specific ICCID. For example, the action may be sending the eSIM profile for storage in an eUICC of a user device, activating the eSIM profile for use to receive telecommunication services from the wireless communication carrier, disabling the eSIM profile to terminate access of the user device to the telecommunication services, or deleting the eSIM profile from the eUICC of the user device.

At block 604, the eSIM profile management platform 106 may determine based on the specific ICCID whether the particular eSIM profile is loaded into a profile data store of a subscription management service. In instances where the eSIM profile is a M2M eSIM profile, the profile may be loaded into a profile data store managed by a SM-DP of the subscription management service. In instances where the eSIM profile is a consumer eSIM profile, the profile may be loaded into a profile data store managed by a SM-DP+ of the subscription management service. In various embodiments, the determination may be made by comparing the specific ICCID to ICCIDs of eSIM profiles that are recorded as being loaded into the profile data stores of subscription management services in the centralized database 132. The data in the centralized database 132 is extracted by the eSIM profile management platform 106 from one or more service data feeds. At decision block 606, if the eSIM profile management platform 106 determines that the particular eSIM profile with the specific ICCID is not loaded ("no" at decision block 606), the process 600 may proceed to block 608. At block 608, the eSIM profile management platform 106 may send an error message to the requesting function of the entity indicating that the action failed. In some embodiments, the error message may include a reason for the failure.

However, if the eSIM profile management platform 106 determines that the particular eSIM profile with the specific ICCID is loaded ("yes" at decision block 606), the process 600 may proceed to block 610. At block 610, the eSIM profile management platform 106 may determine whether the entity has access to the subscription management service. In various embodiments, the eSIM profile management platform 106 may use a permission list maintained for the subscription management service to determine whether the entity has access to the subscription management service. At decision block 612, if the eSIM profile management platform 106 determines that the entity has access to the subscription management service ("yes" at decision block 612), the process 600 may proceed to block 614.

At block 614, the eSIM profile management platform 106 may determine whether the entity has access to the particular eSIM profile based on a partner identifier or a MNO identifier associated with the particular eSIM profile. In instances where the entity is a third-party partner, the partner identifier of the third-party partner is compared to the partner identifier associated with the particular eSIM profile to determine if the identifiers match. Likewise, in instances where the entity is a wireless communication carrier, the identifier of the wireless communication carrier is compared to the MNO identifier associated with the particular eSIM profile to determine if the identifiers match. Accordingly, the entity is determined to have access when the pair of compared identifiers match.

Accordingly, at decision block 616, if the eSIM profile management platform 106 determines that the entity has access to the particular eSIM profile ("yes" at decision block 616), the process 600 may proceed to block 618. At block 618, the eSIM profile management platform 106 may forward the request for performing the action with respect to the particular eSIM profile to the subscription management service. However, if the eSIM profile management platform 106 determines that the entity lacks access to the particular eSIM profile ("no" at decision block 616), the process 600 may proceed to block 608. At block 608, the eSIM profile management platform 106 may send an error message to the requesting function of the entity indicating that the action failed.

Returning to decision block 612, if the eSIM profile management platform 106 determines that the entity lacks access to the subscription management service ("no" at decision block 612), the process 600 may proceed to block 608. Once again, at block 608, the eSIM profile management platform 106 may send an error message to the requesting function of the entity indicating that the action failed.

Figure 7:
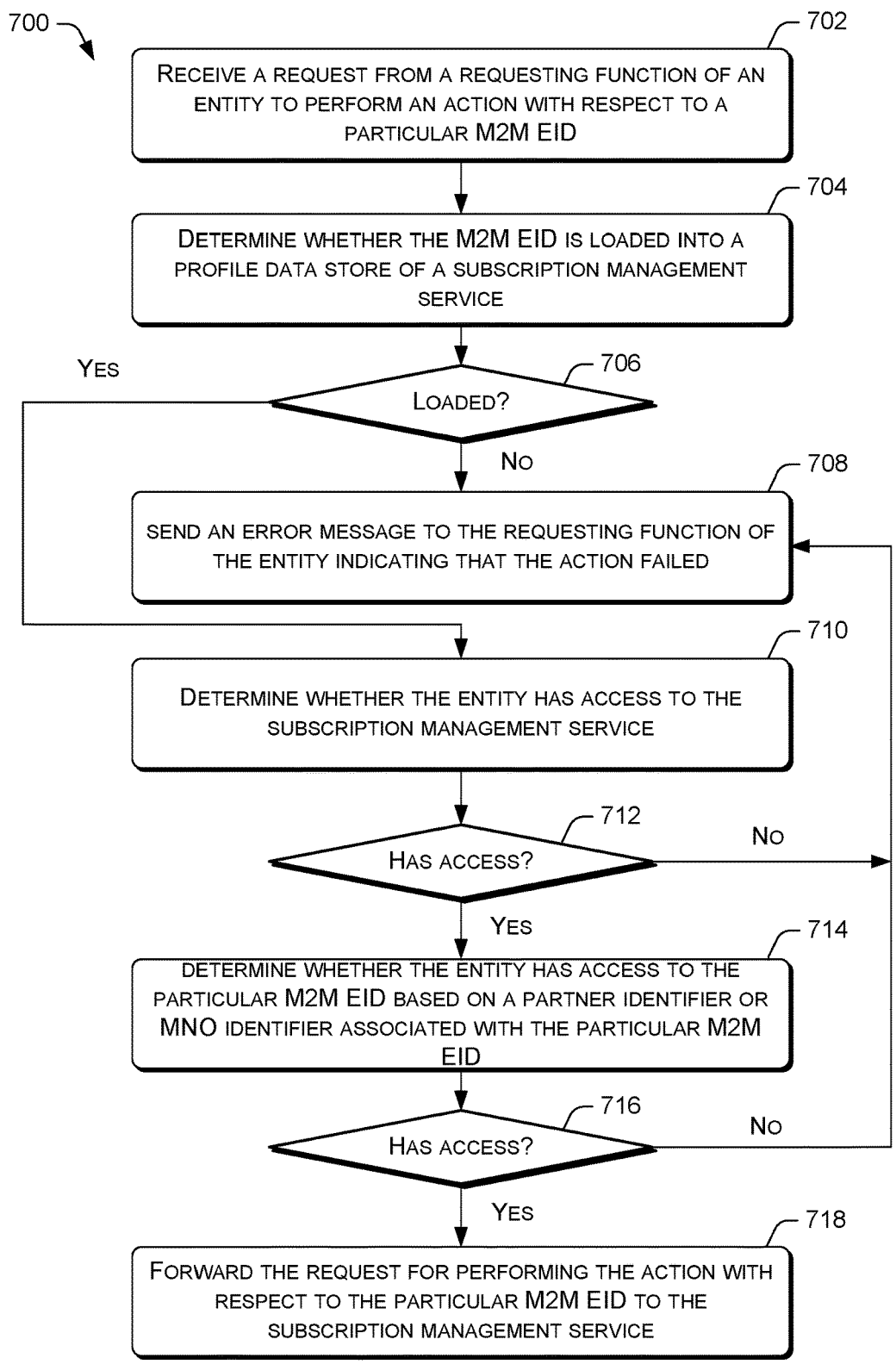
FIG. 7 is a flow diagram of an example process for using the service data feed information from subscription management services to control access to M2M eUICC Identifiers (EIDs) that are stored in an EID data store of a subscription management service.

FIG. 7 is a flow diagram of an example process 700 for using the service data feed information from subscription management services to control access to M2M EIDs that are stored in an EID data store of a subscription management service. At block 702, the eSIM profile management platform 106 may receive a request from a requesting function of an entity to perform an action with respect to a particular M2M EID. In various embodiments, the action may be in the form of reading, modifying, or deleting the particular M2M EID from a SM-SR or an eUICC of a user device.

At block 704, the eSIM profile management platform 106 may determine based on the specific ICCID whether the particular M2M EID is loaded into an EID data store of a subscription management service. The EID data store may be managed by a SM-SR of the subscription management service. In various embodiments, the determination may be made by comparing the specific M2M EID to M2M EIDs that are recorded as being loaded into the EID data stores of subscription management services in the centralized database 132. The data in the centralized database 132 being extracted by the eSIM profile management platform 106 from one or more service data feeds. At decision block 706, if the eSIM profile management platform 106 determines that the particular M2M EID is not loaded ("no" at decision block 706), the process 700 may proceed to block 708. At block 708, the eSIM profile management platform 106 may send an error message to the requesting function of the entity indicating that the action failed. In some embodiments, the error message may include a reason for the failure.

However, if the eSIM profile management platform 106 determines that the particular M2M EID is loaded ("yes" at decision block 706), the process 700 may proceed to block 710. At block 710, the eSIM profile management platform 106 may determine whether the entity has access to the subscription management service. In various embodiments, the eSIM profile management platform 106 may use a permission list maintained for the subscription management service to determine whether the entity has access to the subscription management service. At decision block 712, if the eSIM profile management platform 106 determines that the entity has access to the subscription management service ("yes" at decision block 712), the process 700 may proceed to block 714.

At block 714, the eSIM profile management platform 106 may determine whether the entity has access to the particular M2M EID based on a partner identifier or a MNO identifier associated with the particular M2M EID. In instances where the entity is a third-party partner, the partner identifier of the third-party partner is compared to the partner identifier associated with the particular M2M EID to determine if the identifiers match. Likewise, in instances where the entity is a wireless communication carrier, the identifier of the wireless communication carrier is compared to the MNO identifier associated with the particular eSIM profile to determine if the identifiers match. Accordingly, the entity is determined to have access when the pair of compared identifiers match.

Accordingly, at decision block 716, if the eSIM profile management platform 106 determines that the entity has access to the particular M2M EID ("yes" at decision block 716), the process 700 may proceed to block 718. At block 718, the eSIM profile management platform 106 may forward the request for performing the action with respect to the particular M2M EID to the subscription management service. However, if the eSIM profile management platform 106 determines that the entity lacks access to the particular M2M EID ("no" at decision block 716), the process 700 may proceed to block 708. At block 708, the eSIM profile management platform 106 may send an error message to the requesting function of the entity indicating that the action failed.

Returning to decision block 712, if the eSIM profile management platform 106 determines that the entity lacks access to the subscription management service ("no" at decision block 712), the process 700 may proceed to block 708. Once again, at block 708, the eSIM profile management platform 106 may send an error message to the requesting function of the entity indicating that the action failed.

The ability of the eSIM profile management platform to receive service data feeds from multiple subscription management services allows the eSIM profile management platform to regulate access by various entities to the eSIM profiles managed by the services. The identification information in the data feeds may be used by the platform to prevent unauthorized access by an entity to a subscription management service, unauthorized access by a first entity to eSIM profiles that are ordered by a second entity. The data feeds may also reveal issues such as late or failed transmittals of eSIM profiles to a subscription management service, or eSIM profiles being mistakenly transmitted to and stored by the wrong subscription management service.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform actions comprising:
    loading one or more machine-to-machine (M2M) Embedded Subscriber Identity Module (eSIM) profiles that are received from at least one eSIM profile vendor into one or more Subscription Manager Data Preparation (SM-DP) profile data stores of a subscription management service, each M2M eSIM profile for deployment to an Embedded Universal Integrated Circuit Card (eUICC) in an M2M device;
    sending at least one corresponding Integrated Circuit Card identifier (ICCID) of the one or more M2M eSIM profiles as loaded into the one or more SM-DP profile data stores to an eSIM profile management platform of a wireless communication carrier via a service data feed;
    loading one or more M2M eUICC Identifiers (EIDs) that are received from the at least one eSIM profile vendor into a Subscription Manager Secure Routing (SM-SR) EID data store of the subscription management service; and
    sending the one or more M2M EIDs as loaded into the SM-SR EID data store to the eSIM profile management platform via the service data feed or an additional service data feed, each M2M EID identifying a corresponding eUICC in an associated M2M device, the eSIM profile management platform providing a central interface for a plurality of entities to perform actions with respect to a plurality of eSIM profiles and a plurality of EIDs.

2. The one or more non-transitory computer-readable media of claim 1, wherein the plurality of entities includes the wireless communication carrier, an additional wireless communication carrier hosted by the wireless communication carrier, or a third-party partner of the wireless communication carrier, and wherein the third-party partner is a third-party content provider, a third-party service provider, an M2M device vendor, or an M2M device operator.

3. The one or more non-transitory computer-readable media of claim 1, wherein an ICCID of an M2M eSIM profile in a corresponding service data feed is accompanied by at least one of a mobile network operator (MNO) identifier that identifies a corresponding wireless communication carrier that has access to a corresponding eSIM profile, a subscription management service identifier that identifies a responsible subscription management service that has authority to manage the corresponding eSIM profile, a partner identifier that identifies a third-party partner of the wireless communication carrier that has access to the corresponding eSIM profile, or an eSIM manufacturer (EUM) identifier that identifies an eSIM profile vendor that provided the corresponding eSIM profile.

4. The one or more non-transitory computer-readable media of claim 1, wherein an M2M EID in a corresponding service data feed is accompanied by at least one of a mobile network operator (MNO) identifier that identifies a corresponding wireless communication carrier that has access to the M2M EID, a subscription management service identifier that identifies a responsible subscription management service that has authority to manage the M2M EID, a partner identifier that identifies a third-party partner of the wireless communication carrier that has access to the M2M EID, or an EUM identifier that identifies an eSIM profile vendor that provided the M2M EID.

5. The one or more non-transitory computer-readable media of claim 1, wherein the M2M device is a networked machine that use telecommunication services provided by the wireless communication carrier to communicate with other networked machines.

6. The one or more non-transitory computer-readable media of claim 1, wherein the actions includes one or more first actions for an eSIM profile that includes sending the eSIM profile for storage in an eUICC of a user device, activating the eSIM profile for use to receive telecommunication services from the wireless communication carrier, disabling the eSIM profile to terminate access of the user device to the telecommunication services, or deleting the eSIM profile from the eUICC of the user device, and one or more second actions for an M2M EID that includes reading, modifying, or deleting the M2M EID from a SM-SR or an eUICC of a user device.

7. The one or more non-transitory computer-readable media of claim 6, wherein the eSIM profile management platform uses information from one or more service data feeds to determine whether an entity has access to the eSIM profile to perform the one or more first actions, or access to the M2M EID to perform the one or more second actions.

8. The one or more non-transitory computer-readable media of claim 1, which each of a plurality of SM-DP profile data stores of the subscription management service stores a set of M2M eSIM profiles that is ordered by a different entity.

9. A computer-implemented method, comprising:
    loading one or more machine-to-machine (M2M) Embedded Subscriber Identity Module (eSIM) profiles that are received from at least one eSIM profile vendor into one or more Subscription Manager Data Preparation (SM-DP) profile data stores of a subscription management service, each M2M eSIM profile for deployment to an Embedded Universal Integrated Circuit Card (eUICC) in an M2M device;
    sending at least one corresponding Integrated Circuit Card identifier (ICCID) of the one or more M2M eSIM profiles as loaded into the one or more SM-DP profile data stores to an eSIM profile management platform of a wireless communication carrier via a service data feed;
    loading one or more M2M eUICC Identifiers (EIDs) that are received from the at least one eSIM profile vendor into a Subscription Manager Secure Routing (SM-SR) EID data store of the subscription management service; and sending the one or more M2M EIDs as loaded into the SM-SR EID data store to the eSIM profile management platform via the service data feed or an additional service data feed, each M2M EID identifying a corresponding eUICC in an associated M2M device, the eSIM profile management platform providing a central interface for a plurality of entities to perform actions with respect to a plurality of eSIM profiles and a plurality of EIDs.

10. The computer-implemented method of claim 9, wherein the plurality of entities includes the wireless communication carrier, an additional wireless communication carrier hosted by the wireless communication carrier, or a third-party partner of the wireless communication carrier, and wherein the third-party partner is a third-party content provider, a third-party service provider, an M2M device vendor, or an M2M device operator.

11. The computer-implemented method of claim 9, wherein an ICCID of an M2M eSIM profile in a corresponding service data feed is accompanied by at least one of a mobile network operator (MNO) identifier that identifies a corresponding wireless communication carrier that has access to a corresponding eSIM profile, a subscription management service identifier that identifies a responsible subscription management service that has authority to manage the corresponding eSIM profile, a partner identifier that identifies a third-party partner of the wireless communication carrier that has access to the corresponding eSIM profile, or an eSIM manufacturer (EUM) identifier that identifies an eSIM profile vendor that provided the corresponding eSIM profile.

12. The computer-implemented method of claim 9, wherein an M2M EID in a corresponding service data feed is accompanied by at least one of a mobile network operator (MNO) identifier that identifies a corresponding wireless communication carrier that has access to the M2M EID, a subscription management service identifier that identifies a responsible subscription management service that has authority to manage the M2M EID, a partner identifier that identifies a third-party partner of the wireless communication carrier that has access to the M2M EID, or an EUM identifier that identifies an eSIM profile vendor that provided the M2M EID.

13. The computer-implemented method of claim 9, wherein the M2M device is a networked machine that use telecommunication services provided by the wireless communication carrier to communicate with other networked machines.

14. The computer-implemented method of claim 9, further comprising performing one or more first actions for an eSIM profile that includes sending the eSIM profile for storage in an eUICC of a user device, activating the eSIM profile for use to receive telecommunication services from the wireless communication carrier, disabling the eSIM profile to terminate access of the user device to the telecommunication services, or deleting the eSIM profile from the eUICC of the user device, and performing one or more second actions for an M2M EID that includes reading, modifying, or deleting the M2M EID from a SM-SR or an eUICC of a user device.

15. The computer-implemented method of claim 14, wherein the eSIM profile management platform uses information from one or more service data feeds to determine whether an entity has access to the eSIM profile to perform the one or more first actions, or access to the M2M EID to perform the one or more second actions.

16. The computer-implemented method of claim 9, which each of a plurality of SM-DP profile data stores of the subscription management service stores a set of M2M eSIM profiles that is ordered by a different entity.

17. A system, comprising:
one or more processors; and
memory including a plurality of computer-executable components that are executable by the one or more processors to perform a plurality of acts, the plurality of acts comprising:
loading one or more machine-to-machine (M2M) Embedded Subscriber Identity Module (eSIM) profiles that are received from at least one eSIM profile vendor into one or more Subscription Manager Data Preparation (SM-DP) profile data stores of a subscription management service, each M2M eSIM profile for deployment to an Embedded Universal Integrated Circuit Card (eUICC) in an M2M device;
sending at least one corresponding Integrated Circuit Card identifier (ICCID) of the one or more M2M eSIM profiles as loaded into the one or more SM-DP profile data stores to an eSIM profile management platform of a wireless communication carrier via a service data feed;
loading one or more M2M eUICC Identifiers (EIDs) that are received from the at least one eSIM profile vendor into a Subscription Manager Secure Routing (SM-SR) EID data store of the subscription management service; and
sending the one or more M2M EIDs as loaded into the SM-SR EID data store to the eSIM profile management platform via the service data feed or an additional service data feed, each M2M EID identifying a corresponding eUICC in an associated M2M device, the eSIM profile management platform providing a central interface for a plurality of entities to perform actions with respect to a plurality of eSIM profiles and a plurality of EIDs.

18. The system of claim 17, wherein the plurality of entities includes the wireless communication carrier, an additional wireless communication carrier hosted by the wireless communication carrier, or a third-party partner of the wireless communication carrier, and wherein the third-party partner is a third-party content provider, a third-party service provider, an M2M device vendor, or an M2M device operator.

19. The system of claim 17, wherein an ICCID of an M2M eSIM profile in a corresponding service data feed is accompanied by at least one of a mobile network operator (MNO) identifier that identifies a corresponding wireless communication carrier that has access to a corresponding eSIM profile, a subscription management service identifier that identifies a responsible subscription management service that has authority to manage the corresponding eSIM profile, a partner identifier that identifies a third-party partner of the wireless communication carrier that has access to the corresponding eSIM profile, or an eSIM manufacturer (EUM) identifier that identifies an eSIM profile vendor that provided the corresponding eSIM profile.

20. The system of claim 17, wherein an M2M EID in a corresponding service data feed is accompanied by at least one of a mobile network operator (MNO) identifier that identifies a corresponding wireless communication carrier that has access to the M2M EID, a subscription management service identifier that identifies a responsible subscription management service that has authority to manage the M2M EID, a partner identifier that identifies a third-party partner of the wireless communication carrier that has access to the M2M EID, or an EUM identifier that identifies an eSIM profile vendor that provided the M2M EID.

* * * * *